United States Patent
Kim

(10) Patent No.: US 8,192,861 B2
(45) Date of Patent: Jun. 5, 2012

(54) BATTERY COVER FIXING MEANS FOR PORTABLE TERMINAL

(75) Inventor: Bong-Do Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1232 days.

(21) Appl. No.: 11/475,602

(22) Filed: Jun. 27, 2006

(65) Prior Publication Data

US 2006/0290320 A1    Dec. 28, 2006

(30) Foreign Application Priority Data

Jun. 27, 2005    (KR) .................. 10-2005-0055859

(51) Int. Cl.
*H01M 2/00* (2006.01)
*H02J 7/00* (2006.01)

(52) U.S. Cl. ................ 429/163; 320/112; 320/114

(58) Field of Classification Search .............. None
See application file for complete search history.

(56) References Cited

U.S. PATENT DOCUMENTS

| | | | | |
|---|---|---|---|---|
| 5,587,250 | A | * | 12/1996 | Thomas et al. .............. 429/3 |
| 5,716,730 | A | * | 2/1998 | Deguchi ................... 429/97 |
| 6,515,450 | B1 | * | 2/2003 | Kaiho et al. ............... 320/112 |
| 2005/0084747 | A1 | | 4/2005 | Allen et al. |

FOREIGN PATENT DOCUMENTS

| | | |
|---|---|---|
| EP | 1 626 450 | 2/2006 |
| KR | 10-2004-0010998 | 2/2004 |

* cited by examiner

*Primary Examiner* — Barbara Gilliam
*Assistant Examiner* — Adam A Arciero
(74) *Attorney, Agent, or Firm* — The Farrell Law Firm, P.C.

(57) ABSTRACT

Provided is a battery cover fixing means in a battery cover of a portable terminal which includes at least one pogo pin provided on the portable terminal, at least one combining rib formed on the battery cover and supported on the portable terminal, and at least one fixing groove formed spaced apart from the combining rib on the battery cover. When the battery cover is attached to the portable terminal, the combining rib engages the support groove and thereafter, the pogo pin is fit into and releasably engages the support groove, thereby releasably fixing the battery cover on the portable terminal. Thus, it is easy to open and close a battery mounting groove using a battery cover through a battery cover fixing means using a pogo pin. In addition, the appearance of the portable terminal is improved by obviating the need for a conventional release tab to effect the release of the battery.

7 Claims, 5 Drawing Sheets

US 8,192,861 B2

BATTERY COVER FIXING MEANS FOR PORTABLE TERMINAL

PRIORITY

This application claims priority under 35 U.S.C. §119 to an application entitled "Battery Cover Fixing Means for Portable Terminal" filed in the Korean Intellectual Property Office on Jun. 27, 2005 and assigned Serial No. 2005-55859, the contents of which are incorporated herein by reference.

BACKGROUND OF THE INVENTION

1. Field of the Invention

The present invention generally relates to a portable terminal, and in particular, to a battery cover fixing means for closing a battery mounting groove formed in a portable terminal.

2. Description of the Related Art

In general, a "portable terminal" refers to an electronic communication device for providing communication between users and service providers. Users can carry portable terminals with them to enjoy various services such as voice communication, a short message service, a multimedia service, and an entertainment service.

Conventional portable terminals may be classified in various types according to their appearance. For example, portable communication terminals are classified into bar-type terminals, flip-type terminals, and folder-type terminals according to their appearance. In the bar-type terminal, a transmitting unit, a receiving unit, and data input/output devices are mounted in a single housing. In the flip-type terminal, a transmitting unit, a receiving unit, and data input/output devices are mounted in a single housing like in the bar-type terminal and a flip cover for opening/closing a data input device such as a keypad is further included. In the folder-type terminal, a pair of housings is foldable and a transmitting unit, a receiving unit, and data input/output devices are properly arranged over the pair of housings.

Recently, other types of terminals such as sliding-type terminals and popup-type terminals have become common.

Generally a portable terminal has a battery as a power source and the battery can be mounted on and removed from the rear side of the portable terminal. A battery locking device of a portable terminal for mounting a battery may slidably mount the battery on the rear side of the portable terminal and then fix the battery with a predetermined hook or may attach the battery onto the portable terminal by rotating the battery while one end of the battery being supported by one end of the rear side of the portable terminal and then fix the battery with a predetermined protrusion. The configuration of the battery blocking device may be easily understood by those skilled in the art.

Such a conventional battery locking device of a portable terminal mounts a battery itself on and removes the battery from the portable terminal. As a result, a parting line exists between the portable terminal and the battery. This parting line is not aesthetically appealing, and can thus negatively affect a user's perception about the appearance of the portable terminal. Furthermore, when a user puts the portable terminal into a pocket, charging terminals can be short-circuited with foreign substances such as a key or a coin in the pocket, resulting in a possible short circuit and possible destruction of the battery. Thus, a cover-type battery pack mounting device has been developed to accommodate a battery cell in a portable terminal and close the battery cell. However, a separate removable cover structure is an application example of a conventional battery pack locking device, and can result in problematic mounting and removing operations.

SUMMARY OF THE INVENTION

It is, therefore, an object of the present invention to provide a battery cover fixing means for a portable terminal, which facilitates mounting and removing of a battery cover.

To achieve the above and other objects, there is provided a battery cover fixing means in a battery cover of a portable terminal. The battery cover fixing means includes at least one pogo pin provided on the portable terminal, at least one combining rib formed on the battery cover and supported on the portable terminal, and at least one fixing groove formed spaced apart from the combining rib on the battery cover. When the battery cover is attached onto the portable terminal while the combining rib being supported on the portable terminal, the pogo pin is fit into the fixing groove, thereby fixing the battery cover on the portable terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

Figure 1A:
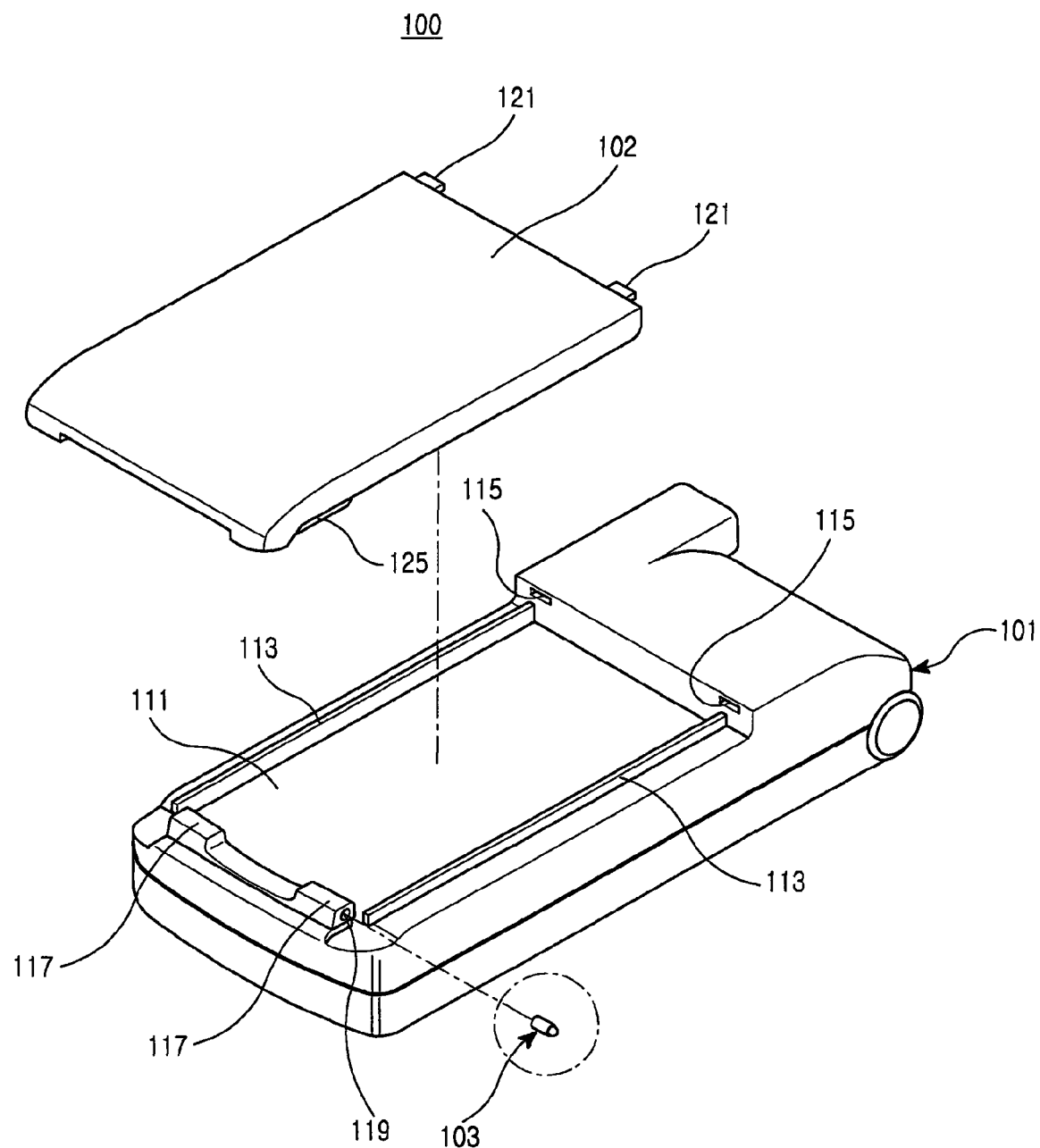
FIG. 1A is an exploded perspective view illustration showing a portable terminal having a battery cover fixing means according to a preferred embodiment of the present invention.
Figure 1B:
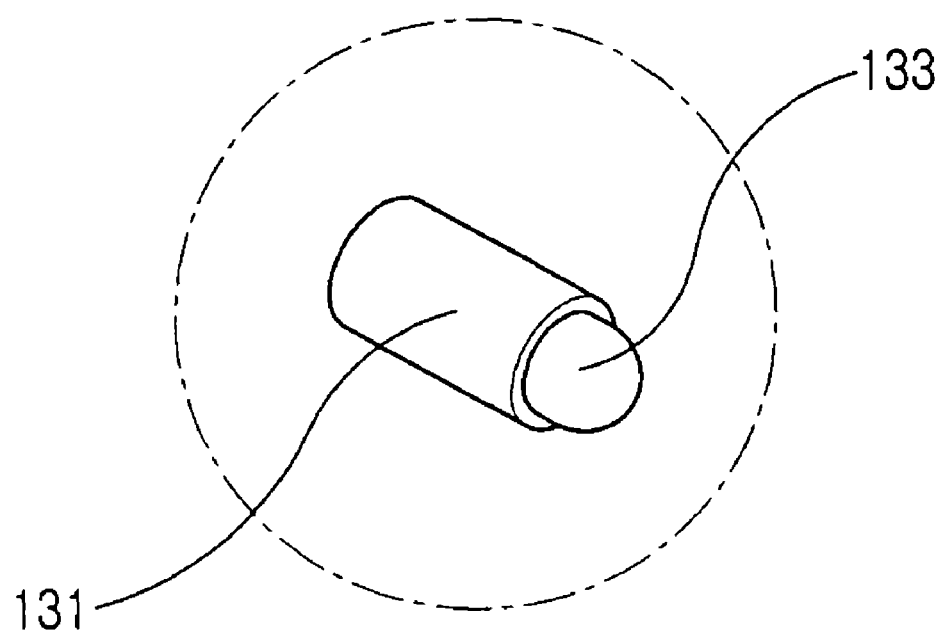
FIG. 1B is a detailed perspective view illustration showing the pogo pin of FIG. 1 according to the preferred embodiment of the present invention.
Figure 2:
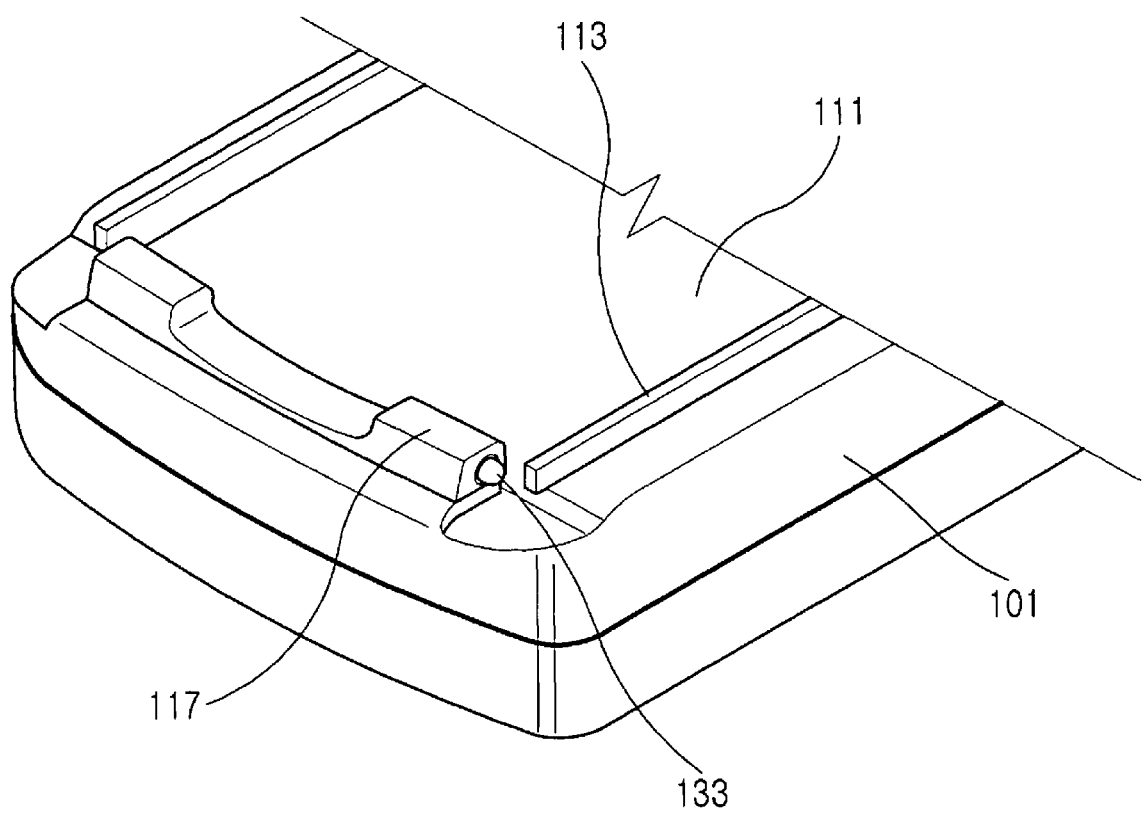
FIG. 2 is a detailed perspective view illustrating a pogo pin mounted in the portable terminal of FIG. 1.
Figure 3:
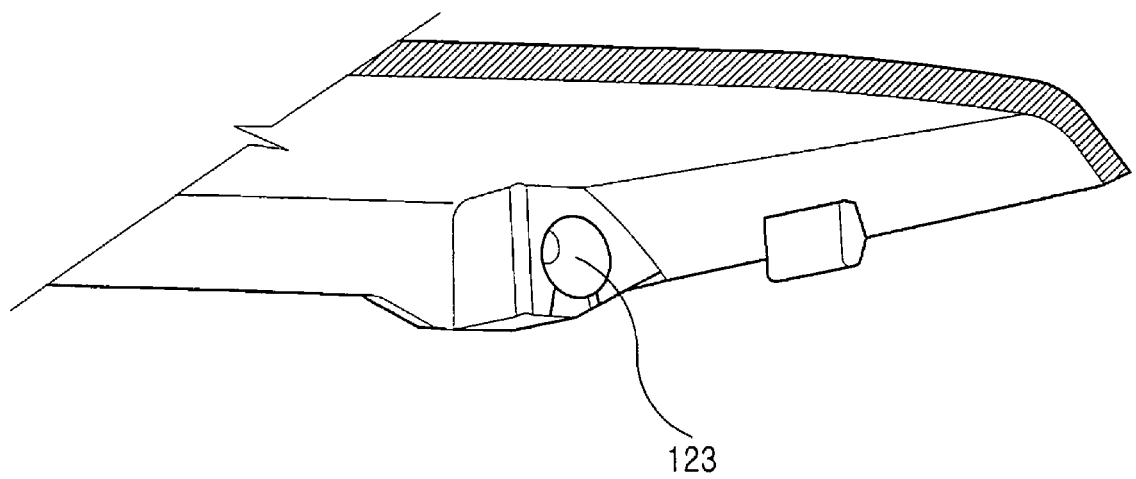
FIG. 3 is a perspective view illustration showing the inner side of the battery cover of FIG. 1 according to the embodiment of the present invention.
Figure 4:
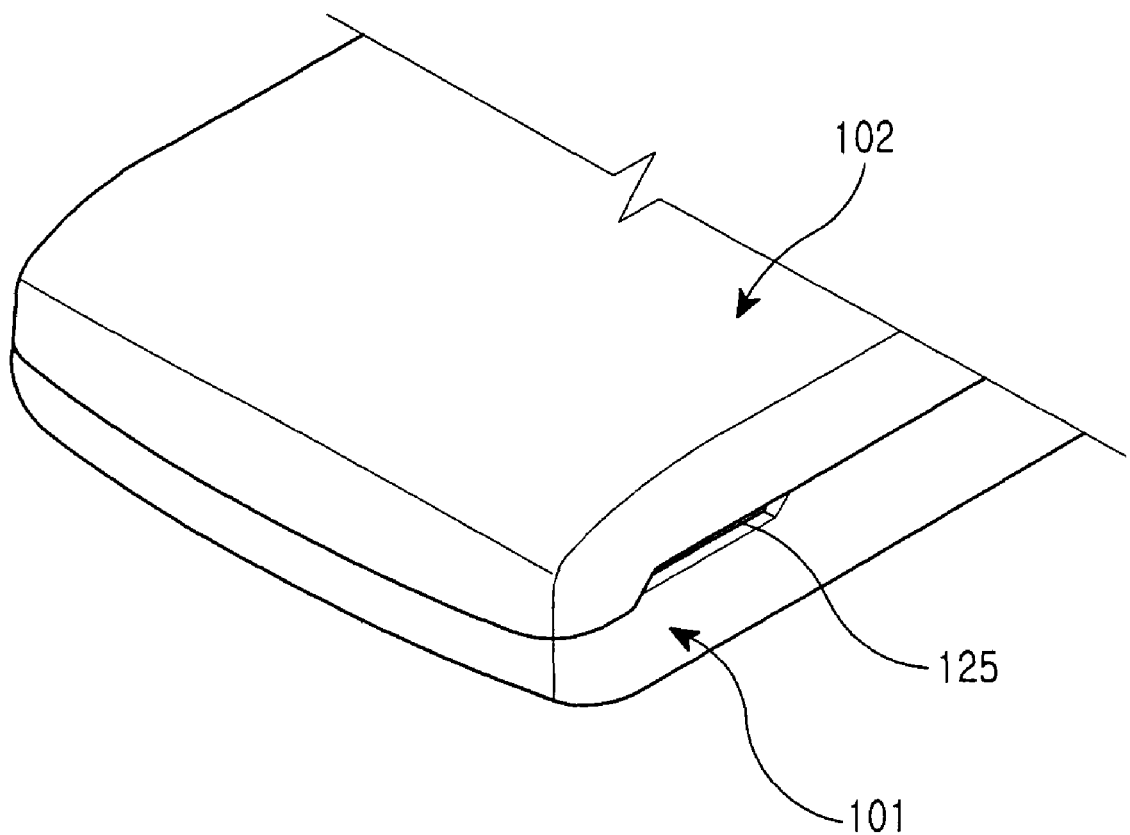
FIG. 4 is a perspective view illustration showing the battery cover combined with a portable terminal of FIG. 1 according to the embodiment of the present invention.

As shown in FIGS. 1A through 4, a battery cover fixing means for a portable terminal 100 according to a preferred embodiment of the present invention uses pogo pins 103.

A battery mounting groove 111 for accommodating a battery cell (not shown) is formed in the rear side of a housing 101 of the portable terminal 100. Guide ribs 113 are formed at both sides of the battery mounting groove 111 to support the battery cell accommodated in the battery mounting groove 111. Support grooves 111 are formed in the inner wall 137 of one end of the battery mounting groove 111. One or more support grooves 115 can be used (as desired). In the current embodiment of the present invention, the support grooves 115 are formed near both lateral ends of the battery mounting groove 111. Supports 117 having holes 119 (only one of which is shown) for receiving the pogo pins 103 are formed at the other end of the battery mounting groove 111. Depending upon design, one or more supports 117 can be used (as desired). In the current embodiment of the present invention, the supports 17 are formed near both lateral ends of the battery mounting groove 111. Thus, the battery mounting groove 111 is surrounded by the guide ribs 113, the supports 117, and the inner wall 137.

The pogo pin 103 includes a body 131 and a fixing protrusion 133. One or more coil (or other type) spring(s) (not shown) can be included in the body 131 for providing a biasing force to cause the fixing protrusion 133 to protrude out of an end of the body 131. The pogo pin 103 is received by the hole 119 of the support 117 the fixing protrusion 133 protrudes out of an end of the support 117. Thus, the biasing force causes the fixing protrusion 133 of the pogo pin 103 to protrude out of an end of the support 117 unless an external force is exerted which can cause the fixing protrusion 133 to recede within the body 131.

A battery cover 102 covers the battery mounting groove 111 when attached onto the housing 101. One or more combining ribs 121 corresponding to the support grooves 115 extend from one end of an outer periphery of the battery cover 102 so that they correspond to the location of the support grooves 115. The combining ribs 121 are formed spaced apart near both sides of the battery cover 102 at one end of the battery cover 102. In some products, only one combining rib may be formed. However, to sufficiently secure a supporting force when only one combining rib 121 is formed, the combining rib 121 may be formed with a sufficient width so that the combining rib can extend a predetermined amount across the width of the battery cover 102. The length and shape of the combining rib 121 can be appropriately set and manufactured by those skilled in the art as deemed necessary based on the supporting force of the battery cover 102.

At least one fixing grooves 123 (shown in FIG. 3) are formed in an inner side of the battery cover 102 which is opposite to the one or more combining ribs 121. In the current embodiment of the present invention, a pair of fixing grooves 123 corresponding to the pogo pins 103 formed in the portable terminal 100 are formed.

The battery cover 102 is attached onto the housing 101 by engaging the combining ribs 121 with the corresponding support grooves 115 and rotating the battery cover 102 towards the housing 101, (with respect to the combining ribs 121 as axes) the battery cover 102 towards the housing 101 while the combining ribs 121 remain engaged in the support grooves 115, and covering the battery mounting groove 111 with the battery cover 102. If the battery cover 102 is completely attached onto the housing 101, the fixing protrusions 133 releasably engage the fixing grooves 123, and thus the battery cover 102 is removably fixed onto the housing 101. To provide a uniform fixing force over the battery cover 102, it is preferable that the combining ribs 121 and the fixing grooves 123 be formed sufficiently spaced apart on the battery cover 102.

When attaching the battery cover 102 to the housing 101, the fixing protrusion 133 slideably engages the inner side of the battery cover 102 so that it is withdrawn into the body 131 of the pogo pin 103. The fixing protrusion 133 then extends from the body 131 when the fixing protrusion is properly aligned with the fixing groove 123 (see, FIG. 3). To prevent abrasion or damage due to friction against the fixing protrusion 133, it is preferable that at least the inner side of the battery cover 102 that is slideably engages the fixing protrusion 133 be formed of an anti-abrasion and durable material such as an acetal resin.

As one end of the battery cover 102, i.e., the combining ribs 121 are supported by the support grooves 115 and the fixing protrusions 133 are fit into (i.e., engage) the fixing grooves 123, the battery cover 102 remains in a desired closed position which covers the battery mounting groove 111.

When it is necessary to replace the battery cell accommodated in the battery mounting groove 111 with a new one, a separating groove 125, formed in at least one side of the battery cover 102, is used to facilitate separation of the battery cover 102. The separating groove 125 provides a location in which a user can exert a force for separating the battery cover 102 from the housing 101. During separation of the battery cover 102 from the housing 101, the combining ribs 121 provide axes of rotation for the battery cover 102 to rotate away from the housing 101 while being supported by the support grooves 115 as the user exerts a force through the separating groove 125 in a direction such that the battery cover 102 rotates with respect to the combining ribs 121.

If the user's force exerted on the separating groove 125 is greater than the force of the coil spring included in the pogo pin 103, the fixing protrusion 133 is pushed in the body 131 and the battery cover 102 rotatably separates from the battery mounting groove 111. If the fixing protrusions 133 are separated from the fixing grooves 123 and the other end of the battery cover 102 is separated from the housing 101, the user can completely separate the battery cover 102 from the housing 101 by pulling the battery cover 102 in a predetermined direction such that the combining ribs 121 separate from the support grooves 115. Once the battery cover 102 is completely separated from the housing 101, the user can easily remove the battery cell accommodated in the battery mounting groove 111 and replace the same with a new one.

As described above, according to the present invention, it is easy to open and close a battery mounting groove using a battery cover through a battery cover fixing means using one or more pogo pins. In addition, a battery mounting groove is closed by a battery cover to prevent a battery cell from being exposed to the outside. Thus, it is possible to improve the appearance of a portable terminal and prevent the risk of a short-circuit caused by foreign substances which may detrimentally affect the performance of a battery cell.

While the invention has been shown and described with reference to a certain preferred embodiment thereof, it will be understood by those skilled in the art that various changes in form and details may be made therein without departing from the spirit and scope of the invention.

What is claimed is:
1. A battery cover fixing means in a battery cover of a portable terminal including a housing, comprising:
   at least one pogo pin provided on the housing and including a body and a fixing protrusion, the body having one or more coil springs inside the body for providing a biasing force to cause the fixing protrusion to slideably protrude out of an end of the body;
   at least one support groove located on the housing;
   at least one combining rib formed on the battery cover;
   at least one fixing groove formed on the battery cover, the at least one fixing groove being located a predetermined distance from the at least one combining rib,
   wherein the battery cover is releasably attached to the housing by engaging the at least one combining rib with the at least one support groove, and rotating the battery cover towards the housing such that the pogo pin engages the fixing groove and releasably fixes the battery cover to the housing,
   wherein when attaching the battery cover to the housing, the fixing protrusion slideably engages the inner side of the battery cover such that the fixing protrusion is withdrawn into the body of the pogo pin, and the fixing protrusion then extends from the body when the fixing protrusion is properly aligned with the fixing groove.

2. The battery cover fixing means of claim 1, wherein the combining rib extends from one end of an outer periphery of the battery cover.

3. The battery cover fixing means of claim 1, wherein a pair of combining ribs extend from one end of the outer periphery of the battery cover and are spaced apart from each other.

4. The battery cover fixing means of claim 1, wherein the at least one support groove is formed on an outer surface of the housing so as to fixedly locate the at least one combining rib relative to the housing when the at least one combining rib is engaged in the at least one support groove.

5. The battery cover fixing means of claim 1, wherein a pair of fixing grooves are located a predetermined distance from each other and are formed on an end of the battery cover.

6. The battery cover fixing means of claim 1, further comprising a battery mounting groove formed on the housing, wherein the battery mounting groove is covered by the battery cover, when the battery cover is attached to the housing.

7. The battery cover fixing means of claim 1, further comprising a separating groove formed in at least one side of the battery cover.

* * * * *